United States Patent
Maeng et al.

(10) Patent No.: US 10,214,636 B2
(45) Date of Patent: Feb. 26, 2019

(54) RUBBER COMPOSITION FOR A TIRE TREAD

(71) Applicant: KUMHO TIRE CO., INC., Gwangju (KR)

(72) Inventors: Jin Oh Maeng, Yongin-si (KR); Ho Min, Yongin-si (KR)

(73) Assignee: KUMHO TIRE CO., INC., Gwangju (KR)

( * ) Notice: Subject to any disclaimer, the term of this patent is extended or adjusted under 35 U.S.C. 154(b) by 66 days.

(21) Appl. No.: 15/431,348

(22) Filed: Feb. 13, 2017

(65) Prior Publication Data

US 2018/0079894 A1 Mar. 22, 2018

(30) Foreign Application Priority Data

Sep. 22, 2016 (KR) .................. 10-2016-0121275

(51) Int. Cl.
| | | |
|---|---|---|
| *C08L 9/00* | (2006.01) | |
| *C08L 7/00* | (2006.01) | |
| *C08L 9/06* | (2006.01) | |
| *B60C 1/00* | (2006.01) | |
| *C08K 5/548* | (2006.01) | |
| *C08L 21/00* | (2006.01) | |

(52) U.S. Cl.
CPC .............. *C08L 9/00* (2013.01); *B60C 1/0016* (2013.01); *C08K 5/548* (2013.01); *C08L 7/00* (2013.01); *C08L 9/06* (2013.01); *C08L 21/00* (2013.01); *C08L 2205/02* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 5,877,249 A | * | 3/1999 | Lambotte | B60C 1/0016 |
| | | | | 152/905 |
| 7,737,209 B2 | * | 6/2010 | Miyazaki | B60C 1/00 |
| | | | | 524/508 |
| 2005/0277717 A1 | * | 12/2005 | Joshi | B60C 1/00 |
| | | | | 524/261 |
| 2006/0116457 A1 | * | 6/2006 | Cambon | B60C 1/0016 |
| | | | | 524/261 |
| 2007/0037908 A1 | * | 2/2007 | Pille-Wolf | B60C 1/0016 |
| | | | | 524/270 |
| 2007/0062623 A1 | * | 3/2007 | Chassagnon | B60C 1/0016 |
| | | | | 152/209.1 |
| 2007/0082991 A1 | * | 4/2007 | Chassagnon | B29D 30/52 |
| | | | | 524/313 |
| 2008/0033082 A1 | * | 2/2008 | Hahn | B60C 1/00 |
| | | | | 524/114 |
| 2008/0121324 A1 | * | 5/2008 | Cambon | B60C 1/0016 |
| | | | | 152/209.1 |
| 2009/0326109 A1 | * | 12/2009 | Kameda | B60C 1/0016 |
| | | | | 524/110 |
| 2011/0306700 A1 | * | 12/2011 | Belin | B60C 1/0016 |
| | | | | 523/156 |
| 2012/0157571 A1 | * | 6/2012 | Longchambon | B60C 1/0016 |
| | | | | 523/351 |
| 2013/0059965 A1 | * | 3/2013 | Hirose | B60C 1/0016 |
| | | | | 524/526 |
| 2013/0267646 A1 | * | 10/2013 | Kameda | C08L 9/06 |
| | | | | 524/526 |
| 2014/0090763 A1 | * | 4/2014 | Sugimoto | B60C 5/14 |
| | | | | 152/450 |
| 2015/0126643 A1 | * | 5/2015 | Satou | B60C 1/00 |
| | | | | 523/156 |
| 2015/0283854 A1 | * | 10/2015 | Saintigny | B60C 1/0016 |
| | | | | 524/313 |
| 2016/0046781 A1 | * | 2/2016 | Miyazaki | B60C 1/0016 |
| | | | | 524/575 |
| 2016/0130427 A1 | * | 5/2016 | Saintigny | B60C 1/0016 |
| | | | | 524/571 |
| 2017/0037225 A1 | * | 2/2017 | Isitman | B60C 1/0016 |
| 2017/0130036 A1 | * | 5/2017 | Kushida | C08K 13/02 |

FOREIGN PATENT DOCUMENTS

| | | | | |
|---|---|---|---|---|
| KR | 10-2015-0052144 A | 5/2015 | | |
| KR | 10-2015-0132607 A | 11/2015 | | |
| WO | WO-2015190346 A1 | * | 12/2015 | ............... B60C 1/00 |

* cited by examiner

*Primary Examiner* — Robert S Loewe
(74) *Attorney, Agent, or Firm* — Knobbe Martens Olson & Bear LLP

(57) ABSTRACT

A rubber composition for a tire tread includes 6 to 20 parts by weight of a silane coupling agent having a mercapto group and SiO bond; and 1 to 20 parts by weight of terpene resin having a softening point of 130° C. or more and a weight average molecular weight of 1,000 or more, to 100 parts by weight of raw rubber.

6 Claims, No Drawings

RUBBER COMPOSITION FOR A TIRE TREAD

CROSS-REFERENCE TO RELATED APPLICATIONS

This application claims priority to Korean Patent Application No. 10-2016-0121275, filed on Sep. 22, 2016 in the Korean Intellectual Property Office, the entire disclosure of which is incorporated herein by reference.

BACKGROUND

1. Field

The present disclosure relates to a rubber composition for a tire.

2. Description of the Related Art

A tire should maintain stable running ability, braking performance and low fuel consumption (that is, high fuel efficiency) in various environments such as ice roads, wet surfaces, snow surfaces, etc. In order to satisfy tire labeling regulations in all countries of the world, it is necessary to maintain at least a predetermined level in terms of wet grip and rolling resistance (RR) performances. In particular, with regard to overcoming trade-off of individual performances, there are some technical problems, for example, such that the wet grip performance is proportional to a glass transition temperature Tg, whereas snow grip performance is inversely proportional to the Tg. In order to overcome the above problems, an approach to development of a novel compounding has been required.

Briefly, the tire should maintain stable running ability and braking performance under diverse environments, that is, ice roads, wet surfaces, snow surfaces, and the like, and in order to satisfy different tire labeling regulations in all countries of the world, maintaining and promoting the wet grip and RR performances to at least a predetermined level for sale have been required.

Korean Patent Laid-Open Publication Nos. 10-2015-0132607 and 10-2015-0052144 disclose the relate technology.

SUMMARY

One aspect of the present invention provides a rubber composition for a tire tread, which is capable of improving rolling-resistant ability, wet grip performance, abrasion resistance, snow grip and ice grip performances, simultaneously.

Another aspect of the present invention provides a rubber composition for a tire tread, comprising: 6 to 20 parts by weight ('wt. part') of a silane coupling agent having a mercapto group and SiO bond; and 1 to 20 parts by weight of terpene resin having a softening point of 130° C. or more and a weight average molecular weight of 1,000 or more, to 100 parts by weight of raw rubber.

Still another aspect of the present invention provides a tire comprising the above rubber composition.

The rubber composition for a tire tread according to embodiments of the present invention may comprise a silane coupling agent having a mercapto group and SiO bond in order to improve trade-off performances, that is, wet grip performance and snow grip performance, thus to improve mixing processability, abrasion resistance, RR performance and wet grip performance, and further comprise a terpene resin having a softening point of 130° C. or more and a molecular weight of 1,000 or more, thus to improve the wet grip performance and snow grip performance while maintaining the enhanced abrasion resistance and RR performance.

DETAILED DESCRIPTION OF EMBODIMENTS

In one example, the rubber composition comprises 50 to 80 wt. parts of an inorganic filler containing silica and carbon black to 100 wt. parts of diene rubber comprising 50 to 80% by weight ('wt. %') of end modified styrene-butadiene rubber having 40 wt. % or more of vinyl units and 20 to 50 wt. % of butadiene rubber, wherein 1 to 20 wt. parts of aromatic modified terpene resin having a softening point of 100° C. or more is further added and mixed therein.

However, the rubber composition for a tire according to the above example would not attain snow performance although rolling-resistant ability, wet grip performance and abrasion-resistance are improved.

In another example, for improving rolling-resistant ability and wet grip performance to known levels or more while maintaining and enhancing extrusion processability, the rubber composition comprises 60 to 130 wt. parts of silica to 100 wt. parts of diene rubber comprising at least 50 wt. % of hydroxyl group-containing modified styrene-butadiene rubber; a weight ratio of oil to a silica-containing filler is 0.25 or less; a silane coupling agent having a mercapto group and Si—O bond is in an amount of 4 to 15 wt. % to a total amount of silica; and diethyleneglycol is mixed in an amount of 1 to 6 wt. % to the total amount of silica. However, the rubber composition for a tire tread in this example would not secure desired snow performance and abrasion resistance although rolling-resistant ability and wet grip performance are improved.

Embodiments of the present invention provide a rubber composition for a tire tread, which comprises: 6 to 20 wt. parts of a silane coupling agent having a mercapto group and SiO bond; and 1 to 20 wt. parts of terpene resin having a softening point of 130° C. or more and a weight average molecular weight of 1,000 or more, to 100 wt. parts of raw rubber.

In the rubber composition for a tire according to embodiments of the present invention, the silane coupling agent having a mercapto group and SiO bond may comprise 3-(octanoylthio)propyl triethoxysilane represented by Formula 1 below:

<Formula 1>

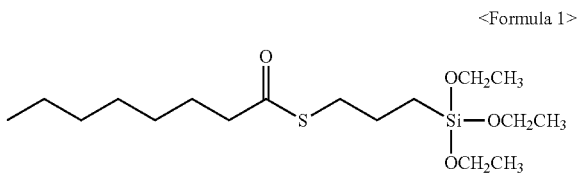 [SMILES: CCCCCCCC(=O)SCCC[Si](OCC)(OCC)OCC]

In the rubber composition for a tire according to embodiments of the present invention, the terpene resin may have a softening point of 130° C. to 180° C., and a weight average molecular weight of 1,000 to 2,000.

In the rubber composition for a tire according to embodiments of the present invention, if the silane coupling agent is comprised or included in an amount of generally less than 6 wt. parts (not absolute) to 100 wt. parts of the raw rubber, a tensile strength may be reduced to cause a problem in processability. If the silane coupling agent is comprised in an amount of generally exceeding 20 wt. parts, tension properties may be reduced and a problem entailed in extrusion processability may occur.

In the rubber composition for a tire according to embodiments of the present invention, if the terpene resin is comprised in an amount of generally less than 1 wt. part (not absolute) to 100 wt. parts of the raw rubber, desired purpose of adding the terpene resin may not be achieved since a content of the terpene resin is too small. On the other hand, if the terpene resin is comprised in an amount of generally exceeding 20 wt. parts (not absolute), problems entailed in the uniformity of the tire building during the building process may occur.

In the rubber composition for a tire according to embodiments of the present invention, the raw rubber may be natural rubber, synthetic rubber or a mixture thereof.

In the rubber composition for a tire according to embodiments of the present invention, types of the synthetic rubber are not particularly limited but may comprise, for example, styrene-butadiene rubber, butadiene rubber, butyl rubber, emulsion-polymerized styrene-butadiene rubber (E-SBR), solution-polymerized styrene-butadiene rubber (S-SBR), epichlorohydrin rubber, nitrile rubber, hydrogenated nitrile rubber, brominated polyisobutyl isoprene-co-paramethyl styrene (BIMS) rubber, urethane rubber, fluorine rubber, silicone rubber, styrene ethylene butadiene styrene copolymer rubber, ethylene propylene rubber, ethylene propylene diene monomer rubber, Hypalon rubber, chloroprene rubber, ethylene vinyl acetate rubber, acryl rubber, and the like.

In the rubber composition for a tire according to embodiments of the present invention, the raw rubber may be diene rubber comprising: 10 to 30 wt. % of end modified styrene-butadiene rubber wherein a styrene unit content is 20 wt. % or less, and preferably, 15 to 20 wt. %, and a vinyl unit content is 30 wt. % or less, and preferably, 25 to 30 wt. %.; 30 to 50 wt. % of styrene-butadiene rubber; and 20 to 60 wt. % of butadiene rubber or natural rubber.

In the rubber composition for a tire according to embodiments of the present invention, the end modified styrene-butadiene rubber may be Sn end modified styrene-butadiene rubber.

The rubber composition for a tire according to embodiments of the present invention may further comprise carbon black and silica.

In the rubber composition for a tire according to embodiments of the present invention, it is preferable that the carbon black is used in particles having a specific surface area of 140 m$^2$/g or less in terms of dispersion and abrasion.

In the rubber composition for a tire according to embodiments of the present invention, the silica may be used in a form having a nitrogen adsorption specific surface area of 90 to 230 m$^2$/g as a BET measurement value.

In the rubber composition for a tire according to embodiments of the present invention, the silica may be comprised in an amount of exceeding 60 wt. parts but less than 120 wt. parts, and preferably, 70 to 110 wt. parts to 100 wt. parts of the raw rubber.

In the rubber composition for a tire according to embodiments of the present invention, if the silica is comprised in an amount of generally 60 wt. parts or less (not absolute) to 100 wt. parts of the raw rubber, wet grip performance may be deteriorated. If the silica is comprised in an amount of generally 120 wt. parts or more (not absolute), there may be problems of considerably reducing mixing processability, abrasion resistance, and low fuel consumption.

The rubber composition for a tire according to embodiments of the present invention may further comprise a vulcanizing agent and such a vulcanizing agent used herein may comprise organic peroxide or sulfur vulcanizing agents. The organic peroxide may comprise, for example, benzoyl peroxide, dicumyl peroxide, di-t-butyl peroxide, t-butyl-cumyl peroxide, methylethylketone peroxide, cumene hydroperoxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3 or 1,3-bis(t-butylperoxypropyl)benzene, di-t-butylperoxy-diisopropylbenzene, t-butylperoxybenzene, 2,4-dichlorobenzoyl peroxide, 1,1-di-t-butylperoxy-3,3,5-trimethylsiloxane, n-butyl-4,4-di-t-butylperoxy valerate, and the like.

Among these, dicumyl peroxide, t-butyl peroxybenzene and di-t-butylperoxy-diisopropylbenzene are preferably used. For example, a sulfur vulcanizing agent used herein may comprise sulfur, morpholine disulfide, etc. Among these, sulfur is preferably used. Such a vulcanizing agent may be used alone or in combination of two or more thereof.

With regard to the rubber composition for a tire according to embodiments of the present invention, typical additives for a rubber composition, for example, zinc oxide, stearic acid, anti-ageing agent, adhesive, or the like, may be further comprised. Also, a content of the additive may be optionally adjusted depending upon desired physical properties.

A method for manufacturing the rubber composition for a tire according to embodiments of the present invention may comprise, mixing the above raw rubber, carbon black, silica, processing oil and an additive such as a silane coupling agent together in a Banbury mixer at a temperature of 80° C. to 150° C. by any conventional method; then, vulcanizing the mixture at 155° C. to 165° C. for 10 to 20 minutes. Therefore, the manufacturing method will not be described in detail.

Further, embodiments the present invention provide a tire comprising the above rubber composition.

The tire according to embodiments of the present invention may be a tire comprising the rubber composition in the tread part.

The tire according to embodiments of the present invention may be manufactured using the above rubber composition for a tire. More particularly, the inventive tire may be manufactured by any conventional method without particular limitation thereof, so long as the tire manufacturing method is commonly known in the art and the rubber composition described above is used.

Hereinafter, embodiments of the present invention will be described in more detail with reference to the following examples. These examples are proposed for illustrative purpose only, however, not particularly limit the scope of the present invention to be protected.

EXAMPLES 1 TO 4 AND COMPARATIVE EXAMPLES 1 TO 11

(Preparation of Rubber Specimen and Measurement of Physical Properties Thereof)

After adding components with constitutional compositions and contents listed in Table 1 below (unit: parts by weight) to a Banbury mixer, these components were mixed at 140° C., thereby preparing a mixture.

Then, sulfur was added to the mixture as a vulcanizing agent, followed by vulcanization at 160° C. for 15 minutes, thereby obtaining a rubber specimen.

Physical properties comprising, for example, processibility according to tensile strength, handling performance, snow grip and wet grip performances, RR performance, abrasion resistance, etc. were measured according to ASTM regulations, and results thereof are shown in Table 1 below.

In Table 1 below, numerical values of the handling performance, snow grip and wet grip performances, RR performance, abrasion resistance and processibility are represented by relative indexes to 100 as a standard value defined for those in Comparative Example 1.

TABLE 1

| Item | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Low Tg Sn modified SSBR1 | | 5 | 40 | 20 | 20 | 20 | 20 | 20 |
| SBR1 | 60 | 55 | 20 | 65 | 15 | 40 | 40 | 40 |
| BR | 40 | 40 | 40 | 15 | 65 | 40 | 40 | 40 |
| NR | | | | | | | | |
| Silica | 85 | 85 | 85 | 85 | 85 | 60 | 120 | 85 |
| Carbon black | 5 | 5 | 5 | 5 | 5 | 5 | 5 | 5 |
| Silane coupling agent 1 | 4 | 4 | 4 | 4 | 4 | 4 | 4 | |
| Silane coupling agent 2 | | | | | | | | 5 |
| Terpene resin | | | | | | | | |
| Tensile strength (Kg/m$^3$) | 170 | 174 | 164 | 189 | 158 | 171 | 184 | 154 |
| Handling performance (Hardness) | 100 | 100 | 106 | 110 | 100 | 95 | 116 | 102 |
| Snow grip performance (Tanδ@-20° C.) | 100 | 100 | 122 | 80 | 118 | 98 | 98 | 102 |
| Wet grip performance (Tan δ0° C.) | 100 | 99 | 85 | 118 | 84 | 88 | 113 | 100 |
| RR performance (Tan60 δ0° C.) | 100 | 102 | 109 | 88 | 94 | 109 | 83 | 94 |
| Abrasion resistance (Din loss gram) | 100 | 101 | 118 | 82 | 123 | 105 | 86 | 96 |
| Processibility (Viscosity) | 100 | 100 | 103 | 99 | 105 | 133 | 40 | 99 |

| Item | Comparative Example 9 | Comparative Example 10 | Comparative Example 11 | Example 1 | Example 2 | Example 3 | Example 4 |
|---|---|---|---|---|---|---|---|
| Low Tg Sn modified SSBR1 | 20 | 20 | 20 | 10 | 20 | 30 | 30 |
| SBR1 | 40 | 40 | 40 | 30 | 40 | 40 | 30 |
| BR | 40 | 40 | 40 | 60 | 40 | 30 | |
| NR | | | | | | | 40 |
| Silica | 85 | 85 | 85 | 85 | 85 | 85 | 85 |
| Carbon black | 5 | 5 | 5 | 5 | 5 | 5 | 5 |
| Silane coupling agent 1 | | | | | | | |
| Silane coupling agent 2 | 25 | 10 | 10 | 20 | 6 | 10 | 10 |
| Terpene resin | | 0 | 30 | 20 | 10 | 10 | 10 |
| Tensile strength (Kg/m$^3$) | 185 | 180 | 180 | 175 | 170 | 185 | 192 |

TABLE 1-continued

| | | | | | | | |
|---|---|---|---|---|---|---|---|
| Handling performance (Hardness) | 95 | 100 | 100 | 103 | 103 | 102 | 100 |
| Snow grip performance (Tanδ@-20° C.) | 102 | 105 | 96 | 102 | 104 | 105 | 104 |
| Wet grip performance (Tan δ0° C.) | 114 | 100 | 117 | 113 | 115 | 117 | 110 |
| RR performance (Tan60 δ0° C.) | 118 | 115 | 79 | 107 | 112 | 115 | 114 |
| Abrasion resistance (Din loss gram) | 105 | 105 | 98 | 105 | 105 | 110 | 107 |
| Processability (Viscosity) | 125 | 114 | 121 | 114 | 118 | 118 | 121 |

Referring to Table 1 above, Low Tg Sn modified SSBR1 has reactive bi-end functional groups at both ends thereof while having been modified with Sn, thus to involve affinitive properties to both of silica and carbon, thereby having an advantage in abrasion resistance, compared to non-affinitive SBR.

Further, since the above low Tg Sn modified SSBR1 has a low ratio of microfine structure (styrene:20 wt. % or less, vinyl:30 wt. % or less), the glass transition temperature (Tg) is considerably reduced to a level of −60° C., thus to have an advantage of improving snow grip performance. Consequently, wet grip and dry grip performances may be enhanced while maintaining abrasion resistance and snow grip performance.

The styrene-butadiene rubber (SBR1) used herein was S-SBR manufactured by KKPC Co., the butadiene rubber (BR) used herein was KBR01 manufactured by KKPC Co., and the natural rubber (NR) used herein was STR20 manufactured by Von Bundit Co., Ltd.

Meanwhile, the silica used herein had a nitrogen adsorption specific surface area of 200±5 m$^2$/g as a BET measurement value, while the carbon black used herein was ASTM Grade 300.

Silane coupling agent 1 used herein was bis-(triethoxysilyl-propyl)-tetrasulfide (Si-69), while silane coupling agent 2 used herein was NXT represented by Formula 1 above, which is manufactured by Momentive Co.

Further, the terpene resin used herein was T160 (softening point: 160° C., weight average molecular weight: 1,127) manufactured by Yasuhara Chemical Co., which is a terpene-based natural resin.

Meanwhile, snow grip performance refers to a snow grip performance alternative index, which has a value of tan δ at −20° C. (tan δ@−20° C.) based on DMA standard. It means that, as this value is higher, snow grip performance becomes more excellent.

Further, abrasion resistance was indicated by an index of DIN (Ueshima Seisakusho Co.) value measured by an abrasion test apparatus. It means that, as this value is lower, a loss in rubber weight is decreased, thus to demonstrate excellent performance. Alternatively, wet grip performance was indicated by an index of tan δ@0° C. value. It means that, as this index is higher, wet grip performance becomes more excellent.

The RR performance was indicated by an index of tan δ@60° C. value. It means that, as this index is higher, the RR performance becomes more excellent. Further, processability may become excellent as a viscosity at 100° C. is decreased, and this result was demonstrated by index formula.

As shown in the results of Table 1 above, it is preferable that the raw rubber used herein contains 10 to 30 wt. % of end modified styrene-butadiene rubber (Low Tg Sn modified SSBR1). If this end modified styrene-butadiene rubber is contained in an amount of generally less than 10 wt. % (not absolute), improvement of snow grip performance may be insignificant (see Comparative Example 2). On the other hand, it could be seen that, if the end modified styrene-butadiene rubber is contained in an amount of generally exceeding 30 wt. % (not absolute), wet grip performance as a trade-off performance may be deteriorated (see Comparative Example 3).

It was demonstrated that, if the butadiene rubber or natural rubber is comprised in an amount of generally less than 20 wt. % (not absolute), abrasion resistance and snow grip performance may be deteriorated (see Comparative Example 4), while wet grip performance may be deteriorated if the above rubber is comprised in an amount of generally exceeding 60 wt. % (not absolute) (see Comparative Example 5).

Further, it was demonstrated that, if the silica is comprised or contained in an amount of generally 60 wt. parts or less (not absolute) to 100 wt. parts of the raw rubber, wet grip performance is deteriorated (see Comparative Example 6), while mixing processibility, abrasion resistance and low fuel consumption may be considerably reduced if the silica is comprised in an amount of generally 120 wt. parts or more (not absolute) (see Comparative Example 7).

Further, it was demonstrated that, if the silane coupling agent having a mercapto group and SiO bond (silane coupling agent 2) is comprised in an amount of generally less than 6 wt. % (not absolute) to 100 wt. parts of the raw rubber, a tensile strength may be considerably decreased to cause a problem in vulcanization processibility (see Comparative Example 8), while handling performance (hardness) may be reduced if the second (2) silane coupling agent is comprised in an amount of generally exceeding 20 wt. % (not absolute) (see Comparative Example 9).

Further, it was demonstrated that, if the terpene resin is comprised in an amount of generally 30 wt. parts or more (not absolute) to 100 wt. parts of the raw rubber, problems in snow grip and RR performances may occur (see Comparative Example 11).

On the other hand, as shown in Examples 1 to 4, inclusion of the end modified styrene-butadiene rubber may improve snow grip performance while maintaining wet grip performance as a trade-off performance. Further, it could be seen that, when the silica is comprised in an amount of exceeding 60 wt. parts but less than 120 wt. parts, wet grip performance may be improved.

Further, when a silane coupling agent having a mercapto group and SiO bond and (silane coupling agent 2) is added in an amount of 6 to 20 wt. parts to 100 wt. parts of the raw rubber, mixing processibility, abrasion resistance, RR performance and wet grip performance may be improved. Further, it could also be seen that, when the terpene resin having a softening point of 130° C. or more and a molecular weight of 1,000 or more is comprised in an amount of 1 to 20 wt. parts, wet grip performance may be improved while maintaining abraision resistance and RR performance.

While the present invention has been described with reference to embodiments and modified examples, the present invention is not limited to the above-described specific embodiments and the modified examples, and it will be understood by those skilled in the related art that various modifications and variations may be made therein without departing from the scope of the present invention as defined by the appended claims, as well as these modifications and variations should not be understood separately from the technical spirit and prospect of the present invention.

According to embodiments of the present invention, in order to improve trade-off performances such as wet grip performance and snow grip performance, there is provided a rubber composition for a tire tread and a tire comprising the same, in which a silane coupling agent having a mercapto group and SiO bond is comprised to improve mixing processibility, abrasion resistance, RR performance and wet grip performance; and also, a terpene resin having a softening point of 130° C. or more and a molecular weight of 1,000 or more is comprised to improve wet grip performance and snow grip performance while maintaining abrasion resistance and RR performance. Consequently, the present invention may be usefully applied to a technical field to which the present invention pertains.

What is claimed is:

1. A rubber composition for a tire tread, comprising:
   6 to 20 parts by weight of a silane coupling agent having a thioester group and SiO bond; and
   1 to 20 parts by weight of terpene resin having a softening point of 130° C. or more and a weight average molecular weight of 1,000 or more, to 100 parts by weight of raw rubber,
   wherein the raw rubber comprises:
      10 to 30% by weight of end modified styrene-butadiene rubber, in which a styrene unit content is 20% by weight or less and a vinyl unit content is 30% by weight or less,
      30% to 50% by weight of styrene-butadiene rubber, and
      20% to 60% by weight of butadiene rubber or natural rubber.

2. The composition according to claim 1, wherein the silane coupling agent is 3-(octanoylthio)propyl triethoxysilane represented by Formula 1 below

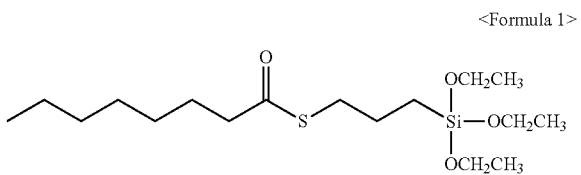 [SMILES: CCCCCCCC(=O)SCCC[Si](OCC)(OCC)OCC]
<Formula 1>

3. A tire comprising the rubber composition according to claim 2.

4. The composition according to claim 1, wherein the raw rubber is natural rubber, synthetic rubber or a mixture thereof.

5. A tire comprising the rubber composition according to claim 4.

6. A tire comprising the rubber composition according to claim 1.

* * * * *